United States Patent [19]
Blakeley

[11] Patent Number: 5,031,755
[45] Date of Patent: Jul. 16, 1991

[54] PIPE LINE TERMINATION SYSTEM

[75] Inventor: James Blakeley, Thornhill, Canada

[73] Assignee: Sprink, Inc., Fullerton, Calif.

[21] Appl. No.: 474,657

[22] Filed: Feb. 5, 1990

Related U.S. Application Data

[63] Continuation of Ser. No. 190,841, May 6, 1988, abandoned.

[51] Int. Cl.⁵ ............................................. F16L 17/04
[52] U.S. Cl. .................................. 285/112; 285/177; 285/179; 29/428
[58] Field of Search ............... 285/112, 177, 184, 179; 29/428

[56] References Cited

U.S. PATENT DOCUMENTS

| | | | |
|---|---|---|---|
| 212,599 | 2/1879 | Gumlich | 285/179 |
| 471,247 | 3/1892 | Vanderman | 285/179 X |
| 530,679 | 12/1894 | Brien | 285/411 |
| 671,366 | 4/1901 | Brodie | 285/179 X |
| 1,278,651 | 9/1918 | Heymann | 285/177 |
| 1,675,184 | 6/1928 | Loepsinger | 285/177 |
| 1,926,414 | 9/1933 | Welke | 285/177 |
| 3,362,730 | 1/1968 | St. Clair et al. | 285/112 |
| 4,391,458 | 7/1983 | Blakeley | 285/112 |
| 4,557,509 | 12/1985 | Giebeler | 285/112 |
| 4,643,461 | 2/1987 | Thau, Jr. et al. | 285/112 |

FOREIGN PATENT DOCUMENTS

| | | | |
|---|---|---|---|
| 180728 | 5/1986 | European Pat. Off. | 285/112 |
| 483576 | 6/1954 | Italy | 285/179 |
| 2412 | of 1901 | United Kingdom | 285/367 |
| 230957 | 3/1925 | United Kingdom | 285/112 |

Primary Examiner—Dave W. Arola
Attorney, Agent, or Firm—Harness, Dickey & Pierce

[57] ABSTRACT

A novel terminal outlet fitting for use in sprinkler systems with a standard split-sleeve sealing coupling engaging the fitting and a standard grooved end pipe, in order to provide an oriented pressure outlet to which a sprinkler head may be fitted. The fitting provides a high efficiency low pressure drop, streamlined flow so that effective sprinkler discharges is achieved. The process avoids the previously labor intensive high cost welding attachment of a connection outlet over a hole drilled through the pipe wall, characterized by poor flow characteristics, and the need to provide a separate pipe end closure and effects a material saving in piping. The novel fitting and its method of use effects significant direct cost savings, in material and on-site labor, and provides a more effective sprinkler system.

11 Claims, 3 Drawing Sheets

PIPE LINE TERMINATION SYSTEM

This is a continuation of U.S. Pat. application Ser. No. 07/190,841, filed May 6, 1988 and now abandoned.

FIELD OF THE INVENTION

The present invention provides an improved pipe line terminal outlet fitting, particularly suited for use with sprinkler systems used in commercial buildings and a method of attaching a terminal outlet fitting to a pipe line.

BACKGROUND OF THE INVENTION

The provision of automated sprinkler fire protection systems requires numerous pipe runs or lines that each carry a number of spaced, threaded outlets into which sprinkler heads are installed. One end of each run is connected to the water supply and the other end capped-off immediately adjacent the last sprinkler outlet.

The proivision of each run thus has included, for each run termination, the requirement to drill the pipe wall, weld a threaded outlet in sealed relation to the drilled pipe, provide capping-off attachment means by way of grooving or threading the pipe end, and applying a closure cap thereto, comprising respectively a threaded fitting or a grooved end fitting.

A sprinkler system may readily contain many hundreds of such runs, having a significant labor cost associated with the total number of such pipe terminations. In csases where the last pipe length of a run is cut to length, machined and capped on site, the labor intensiveness of existing end termination systems is, self-evident. It is an object of the present invention to significantly reduce the labor content of such pipe line terminations. Moreover, it is a further object of this invention to obtain the same sprinkler head placement at the end of a run, whilst saving several inches of pipe. While this saving may be negligible in respect of a single run termination, the material savings in an entire building will be significant.

SUMMARY OF THE INVENTION

In accordance with the present invention there is provided a pipe outlet fitting comprising an end cap portion having a full-flow threaded outlet.

The outlet generally is inclined at ninety degrees from the cap portion thereof.

In a preferred embodiment, the pipe outlet fitting is used in combination with any suitable split-sleeve coupling (sometimes referred to herein as a "victaulic" pipe coupling), wherein the pipe is grooved adjacent the end, to receive the coupling sleeve in secured sealing relation thereto. An example of a suitable victaulic coupling can be seen in U.S. Pat. No. 3,362,730 (St. Clair et. al.), January 1968 or in U.S. Pat. No. 4,391,458 (Blakeley) July 1983. The proximal end of the outlet fitting presents an end portion which is diametrically and axially sized to the coupling sleeve.

The outlet portion of the fitting generally comprises a smoothly curved transition flow passage of reduced diameter, having a threaded distal end preferably directed at right angles to the proximal end face thereof, to provide predetermined oriented attachment for, for example, a sprinkler outlet.

The adoption of a smoothly curved transition passage provides optimal flow conditions and minimal head loss, which is of particular significance and safety value at the remote end of a pipe run, where pressure is lowest. Further, the avoidance of sharp edged pipe access holes, aided further by the capability of adopting a cast construction for the fitting, with a suitably radiused inlet, promotes optimal flow characteristics for the associated terminal sprinkler heads, at a moderate cost.

The present invention thus provides an outlet fitting for attachment to an end of a pipe of predetermined diameter, the fitting having a proximal end portion of predetermined cylindrical outer diameter and axial extent for attachment of the proximal end portion thereof in capping relation to the pipe end, and having a flow-passage therethrough for flow connection to the pipe, the fitting having a distal end portion spaced from the proximal end portion, and a peripheral shoulder portion adjacent to and extending generally normally to the proximal end face, the fitting being adapted, in use, to receive a victaulic pipe coupling means in secured, sealing relation with said proximal end portion and said shoulder portion.

The outlet fitting in accordance with the present invention is intended to be used in combination with a victaulic pipe coupling means, to enable rapid, sealing connection thereof to a grooved pipe end. Thus there is provided a piping system having a plurality of runs, the termination of the runs being in accordance with the present invention.

The subject system thus includes the method of attaching an outlet fitting adjacent to an end of a pipe, comprising the steps of:

(1) providing a pipe of predetermined diameter having a substantially true end;
(2) providing an outlet fitting having a cylindrical attachment portion substantially equi-diameter to the pipe and of predetermined length, with a conduit portion of reduced diameter extending in arcuate relation from the attachment portion and having an axis of discharge inclined from the main axis of the pipe;
(3) providing a split sleeve coupling means attachable in gripping, sealing relation to the pipe and to the outlet fittings;
(4) connecting the pipe to a supply system to locate the true end of the pipe to a supply system to locate the true end of the pipe in a predetermined location;
(5) securing the outlet fitting thereto by way of the coupling means;
(6) orienting the axis of discharge in a predetermined direction; and,
(7) tightening the coupling means into sealing relation with the pipe and the outlet fitting.

In completing the system, a sprinkler outlet is preferably secured to the outlet member.

BRIEF DESCRIPTION OF THE DRAWINGS

A preferred embodiment of the invention is described by way of example only, without limiting the invention thereto, reference being made to the accompanying drawings, wherein.

DETAILED DESCRIPTION OF THE INVENTION

Figure 1:
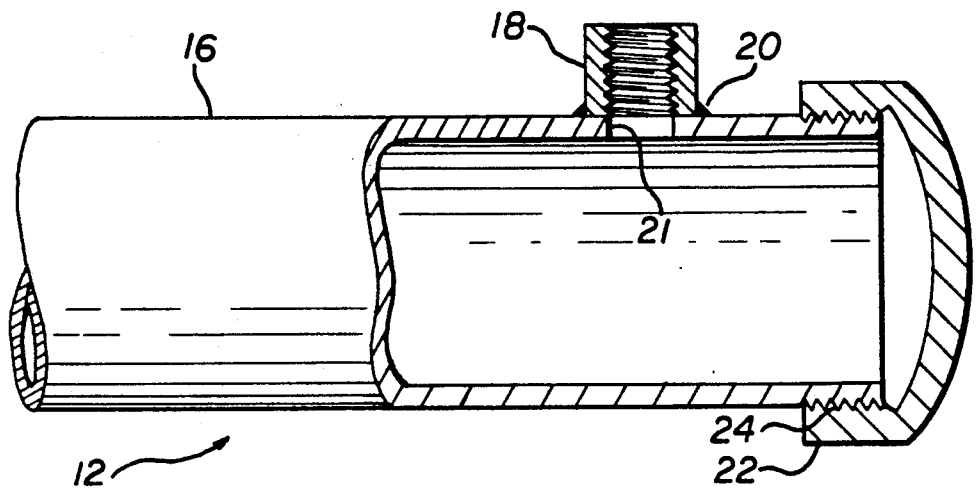
FIG. 1 is a side view in partial section of a first Prior Art terminal outlet take-off and end cap arrangement.
Figure 2:
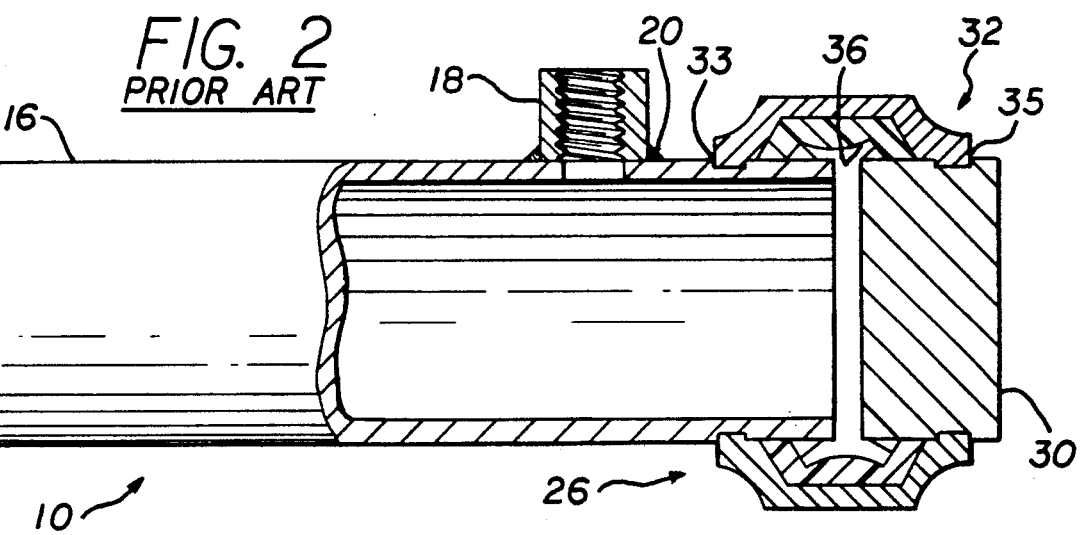
FIG. 2 is a view similar to FIG. 1 of a second Prior Art arrangement, having an alternative end cap arrangement.

Referring to the Prior Art embodiments of FIGS. 1 and 2, the respective arrangements 12 and 10 comprise a water supply pipe 16 having an upwardly extending outlet 18 secured by a peripheral weld 20, in substantially centered, sealed relation with bore 21 in the wall of pipe 16.

In FIG. 2 a closure plug 30 is secured by way of a split vitaulic coupling 32, such as generally embodied in U.S. Pat. No. 4,391,458 (Blakeley) July 1983, for which the pipe 16 and closure plug 30 are grooved at 33 and 35 respectively. An axially split peripheral gasket 36 is located in compressed, peripheral sealing relation with the respective outer peripheries of pipe 16, and closure plug 30, to form a leak-tight seal.

In the FIG. 1 Prior Art embodiment, a threaded closure cap 22 makes sealed threaded engagement at 24 with the threaded exterior end of pipe 16.

In the matter of practical detail it will be understood that pipe 16 is typically in the order of up to two and one half inches in diameter, and in use contains water at a pressure of about 200 pounds per square inch, gauge.

Figure 3:
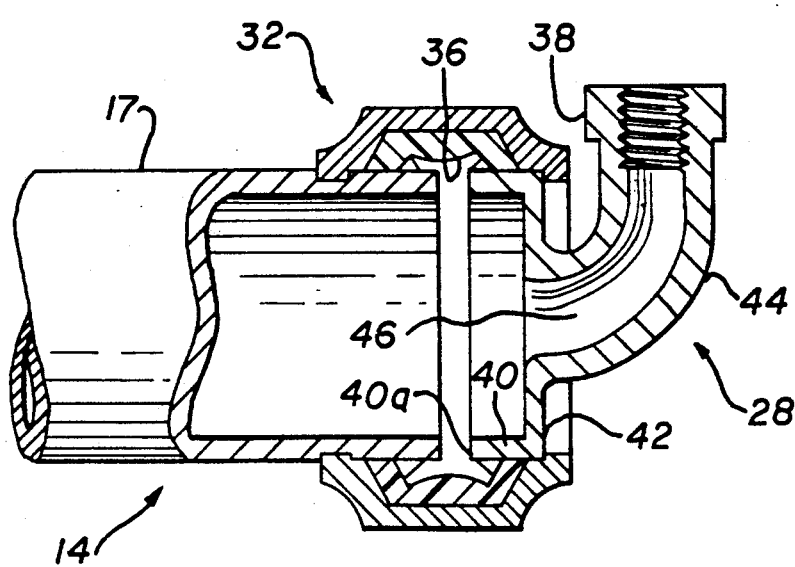
FIG. 3 is a view similar to FIGS. 1 and 2 of a combined outlet and end cap fitting in accordance with the present invention; and, FIG. 4 is a perspective view of the combined outlet and end cap fitting of FIG. 3 in partially assembled relation with a pipe and split-sleeve coupling.

In the FIG. 3 embodiment of the present invention, the arrangement 14 comprises a pipe 17, which is somewhat shorter than pipes 16, for achievement of like axial positioning of the outlet 38, relative to the Prior Art outlets 18, as can be readily seen from the drawings, which have the respective outlets 18, 38 in aligned relation. Thus the system in accordance with the present invention results in a saving in pipe with each end closure, with consequent cost savings.

The terminal outlet fitting 28 has a cylindrical proximal end portion 40 with a peripheral shoulder portion 42 for engagement by a split-sleeve coupling 32. The shoulder portion 42 is generally parallel to the end face 40a of the proximal end portion 40. The coupling gasket 36 makes sealing contact with the radially outer surface of the proximal end portion 40.

The outlet fitting 28 has a transition passage portion 44 connecting with the internally threaded outlet 38. A sprinkler head (not shown), which does not form a part of the present invention, is screwed in a conventional manner into outlet 38. The passage portion 44 is smoothly curved to provide a streamlined flow therethrough and is also provided with a radiused inlet 46 to further promote unrestricted flow.

Figure 4:
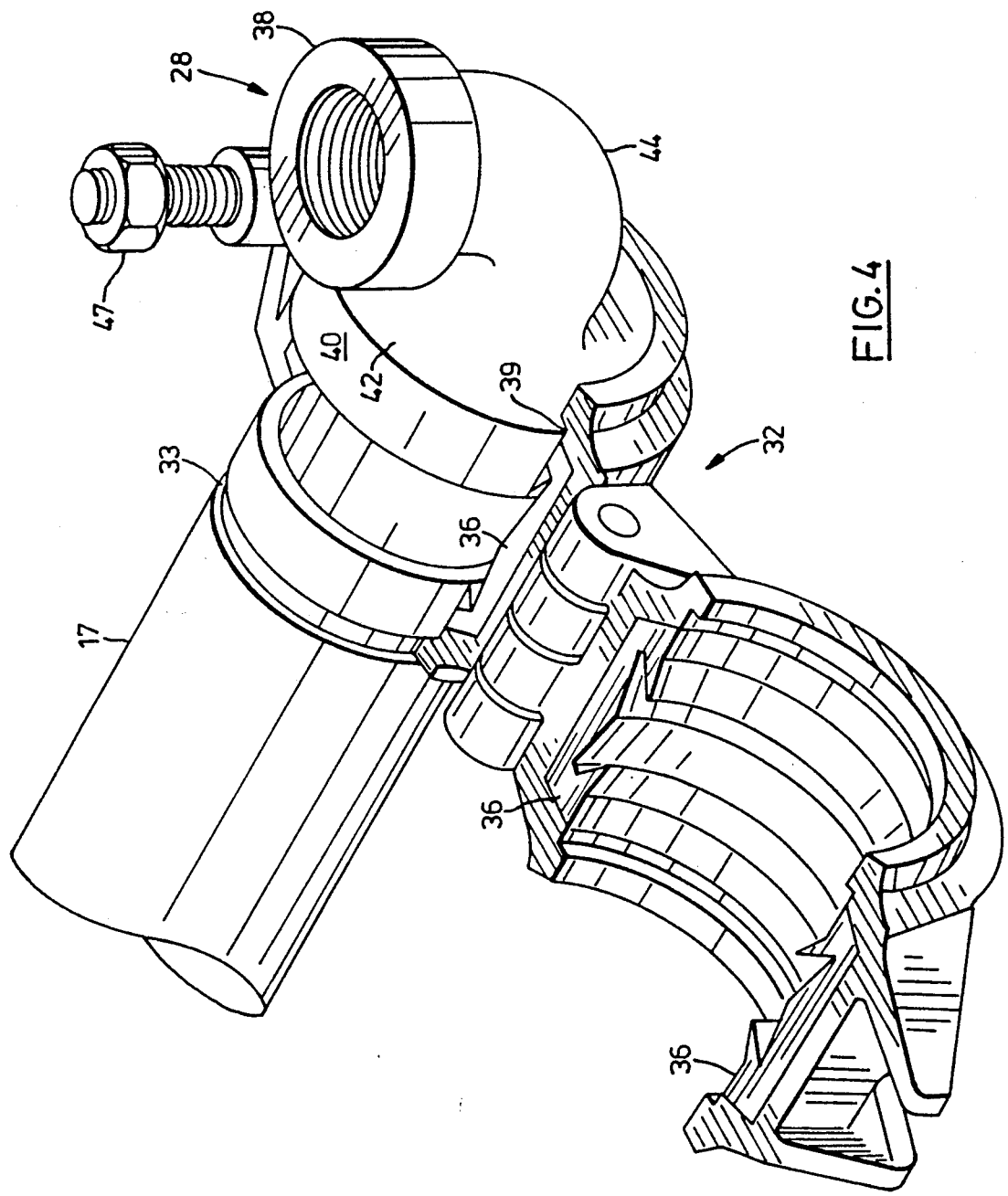
Figure 5:
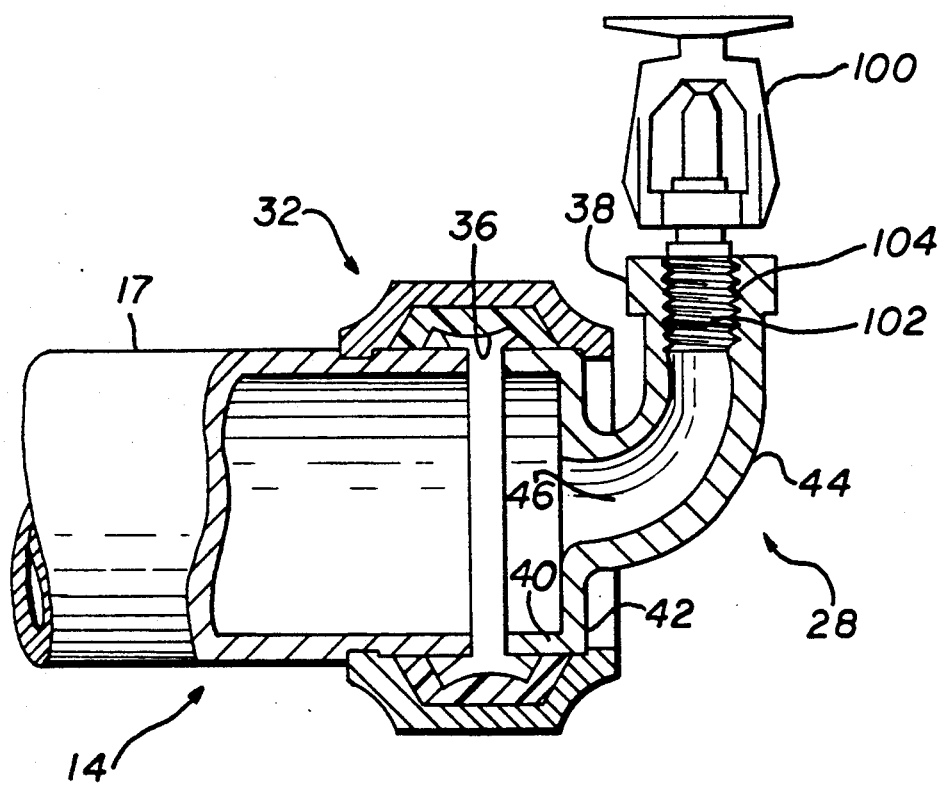

Referring to FIG. 4, the terminal outlet fitting 28 is shown in assembled relation with pipe 17 and the lower half of split-sleeve coupling 32. The coupling split gasket 36 makes sealing contact with the cylindrical cap portion 40. The peripheral shoulder 42 of end fitting 28 is axially and radially engaged by flange 39 of coupling 32. Closure of the halves of split-sleeve coupling 32, and compression of gasket segments 36 by tightening nut 47 secures the outlet fitting 28 in positioned, sealed relation with pipe 17.

While the invention and also the Prior Art embodiments are all illustrated with a particular orientation it will be appreciated that other orientation are also readily provided.

It will be further understood that the present invention may be modified and adapted, within the scope of the following claims.

I claim:

1. A terminal outlet for a fire sprinkler head, a fitting for attachment to an end portion of a grooved pipe of a predetermined cylindrical outer diameter, said fitting comprising:
    a proximal end-portion having a proximal end face and a circumferential outer wall of predetermined cylindrical outer diameter and axial extent, the proximal end face thereof having a flow-passage therethrough, for flow connection with a pipe of said predetermined cylindrical outer diameter:
    a full-flow female threaded distal end-portion adapted to receive an external threaded fire sprinkler head, spaced from said proximal end-portion, said distal end-portion adapted to provide predetermined oriented attachment for a sprinkler head, said flow-passage passing from said proximal end face to and through said distal end-portion, said flow-passage being smaller at the distal end-portion than at the proximal end-portion,
    a peripheral shoulder portion adjacent to and extending radially inward from the circumferential outer wall of said proximal end-portion, said peripheral shoulder portion being generally parallel to said proximal end face;
    the fitting being thereby adapted, in use, to receive a split-sleeve pipe coupling means having radially inwardly extending side walls and a coupling gasket in secured, sealing relation with said proximal end-portion, the peripheral shoulder portion adapted to be axially and radially engaged by one of the side walls of the coupling means and the groove at the end of the grooved pipe adapted to be engaged by the other side wall of the coupling means to secure the fitting to a pipe in a sealed relationship.

2. The fitting as set forth in claim 1, said promixal end portion comprising substantially a right circular cylinder, the axial extent thereof being defined by said shoulder portion.

3. The fitting as set forth in claim 2, said internally threaded distal end portion is adapted to receive an externally threaded fitting in attached relation thereto.

4. The fitting as set forth in claim 3, wherein the axis of said flow-passage through said distal end portion is angularly inclined from the axis of said flow-passage through said proximal end portion.

5. The fitting as set forth in claim 4, wherein said flow-passage is substantially smoothly curved through ninety degrees 90° from said proximal end portion to said distal end portion.

6. The combination of a terminal outlet fitting and pipe coupling means for coupling a terminal fitting to the end of a grooved pipe in a pipe run, said combination comprising:
    (I) a terminal outlet fitting for attachment to an end of a grooved pipe of a predetermined cylindrical outer diameter comprising:
        (a) a proximal end-portion having a proximal end face and circumferential outer wall of predetermined cylindrical outer diameter and axial extent, the proximal end face having a flow-passage therethrough for flow connection to the pipe of said predetermined cylindrical outer diameter;
        (b) a threaded distal end-portion spaced from said proximal end-portion, said distal end-portion adapted to provide predetermined oriented attachment for an additional fitting, the flow-passage from said proximal end face to and through said distal end portion, said flow-passage being smaller at the distal end-portion than at the proximal end portion; and (c) a peripheral shoulder portion adjacent to and extending radially inward from the circumferential outer wall of said proximal end-portion, said peripheral shoulder portion being generally parallel to said proximal end face; and (II) a split-sleeve pipe coupling having radially inward extending sidewalls and a coupling gasket between said sidewalls, said gasket adapted to sealing engage said grooved pipe and fitting, said coupling adapted to engage the groove at the end of the groove pipe and the shoulder portion of the terminal outlet fitting to secure the fitting and pipe in a sealed relationship.

7. (I) A terminal outlet for the pipe end of a supply system comprising:

a terminal outlet fitting for attachment to the end of a pipe of a predetermined cylindrical outer diameter, said fitting comprising (a) a proximal end-portion having a proximal end face and a circumferential outer wall of predetermined cylindrical outer diameter and axially extent, the proximal end face thereof having a flow-passage therethrough for flow connection with the end of a pipe of said predetermined cylindrical outer diameter;

(b) a threaded distal end-portion spaced from said proximal end-portion, said distal end-portion adapted to provide predetermined oriented threaded attachment for an additional fitting, said flow-passage passing from said proximal end face to and through said distal end portion, said flow-passage being smaller at the distal end-portion than at the proximal end-portion;

(c) a peripheral shoulder portion adjacent to and extending radially inwardly from the circumferential outer wall of said proximal end-portion, said peripheral shoulder portion being generally parallel to said proximal end face;

(II) a pipe of said predetermined cylindrical outer diameter having a substantially planar, normal end face and a peripheral groove of predetermined minimum width and depth extending circumferentially about an outer surface portion of the pipe substantially parallel to the end face of the pipe and spaced a predetermined distance axially therefrom, the peripheral groove having a shoulder portion defined by the outer surface portion of the pipe and the radially extending wall of the groove;

(III) gasket means; and (IV) a split-sleeve pipe coupling means having radially inwardly extending sidewalls adapted to engage the shoulder portion of the peripheral groove of the pipe and the shoulder portion of the terminal outlet fitting to secure the terminal outlet fitting and pipe together, the split-sleeve pipe coupling means adapted to retain the gasket between the sidewalls and to compress the gasket means in peripheral sealing relation with the respective outer surface portions of the pipe and the circumferential outer wall of the proximal end portion of the fitting.

8. The combination as set forth in claim 7 forming a portion of a sprinkler system, said distal end portion adapted to receive a sprinkler head in attached relation thereto.

9. The combination as set forth in claim 8, wherein said threaded portion is on a radially outer surface portion of said distal end portion.

10. A method of attaching a terminal outlet fitting to the end of a pipe comprising:

securing a terminal outlet to the end of a peripherally grooved pipe in a sealed relationship employing a split-sleeve pipe coupling means, a gasket means, and the terminal outlet fitting comprising:

(a) a proximal end-portion having a proximal end face and a circumferential outer wall of predetermined cylindrical outer diameter and axial extent, the proximal end face thereof having a flow-passage therethrough for flow connection with a pipe of said predetermined cylindrical outer diameter;

(b) a threaded distal end-portion spaced from said proximal end-portion, said distal end-portion adapted to provide predetermined oriented attachment for an additional fitting, said flow-passage passing from said proximal end face to and through said distal end-portion, said flow-passage being smaller at the distal end-portion than at the proximal end-portion; and (c) a peripheral shoulder portion adjacent to and extending radially inwardly from the circumferential outer wall of said proximal end-portion, said peripheral shoulder portion being generally parallel to said proximal end face;

The split-sleeve pipe coupling means having radially inwardly extending sidewalls adapted to retain and compress the gasket means in a peripherally sealing relation with the respective outer walls of the pipe and the circumferential outer wall of the proximal end portion of the fitting to form a tight seal, the radially inwardly extending sidewall is adapted to engage a shoulder portion of a peripheral groove of the pipe and the shoulder portion of the terminal outlet of the fitting to secure the fitting and pipe in a sealing relation, the pipe having a substantially planar, normal end face and the peripheral groove, the groove having a predetermined minimum width and depth extending circumferentially about an outer surface portion of the pipe substantially parallel to the end face of the pipe and spaced at a predetermined distance axially therefrom, the peripheral groove having a shoulder portion defined by the outer surface portion of the pipe and the radially extending wall of the groove;

orienting the axis of a distal end-portion of the fitting in a predetermined direction; and tightening the split-sleeve coupling means into a secure, sealing relation with the pipe and the terminal outlet fitting.

11. The method as set forth in claim 10 including securing a sprinkler head to said threaded distal end portion.

* * * * *